FIG. 1

INVENTORS
RICHARD G. LAUCHER
KIRKWOOD M. LEE
BY
Christie, Parker & Hale
ATTORNEYS

INVENTORS.
RICHARD G. LAUCHER
KIRKWOOD M. LEE
BY
Christie, Parker & Hale
ATTORNEYS.

United States Patent Office 3,524,481
Patented Aug. 18, 1970

3,524,481
WIRE TYING APPARATUS
Richard G. Laucher and Kirkwood M. Lee, Ogden, Utah, assignors to Nicholas E. Griffin, Pasadena, Calif.
Filed Mar. 4, 1968, Ser. No. 710,070
Int. Cl. B21f 27/08
U.S. Cl. 140—93.6
31 Claims

ABSTRACT OF THE DISCLOSURE

A plurality of side-by-side wire tying units operate to simultaneously tie a transverse reinforcing bar to a plurality of longitudinal reinforcing bars. Each unit includes a magazine, an ejector assembly and a twister head assembly. The magazine stores a plurality of generally U-shaped wire ties and feeds these ties into the ejector assembly. The ejector assembly includes a magnetic chuck which is capable of rotation in a housing between a first and second position. The magnetic chuck positions individual wire ties such that they will be driven over crossed reinforcing bars at about a 45° angle with respect to their intersecting axes. The rotational facility of the chuck allows alternate 45° positioning of wire ties with successive tyings of transverse to longitudinal bars. An individual wire tie is driven over the crossed reinforcing bars by an ejector shaft and held in position at its crown against the uppermost reinforcing bar. The twister head assembly includes a sleeve with a cavity and an axially disposed and displaceable head. The sleeve accepts the legs of a positioned wire tie with the head out of the cavity. The legs of the wire tie are firmly clamped between the walls of the cavity and the head by the head drawing inwardly of the cavity. While being clamped, a tension force is applied on the legs to deform the wire tie into intimate contact with the reinforcing bars which it straddles. With the legs so clamped and the tension maintained on the wire tie, the head and sleeve rotate to twist a portion of the legs together into a tight spiral and to sever the legs by overtwist at about the midpoint of the spiral. The twisting stretches the wire into a tight loop around the reinforcing bar joint.

BACKGROUND OF THE INVENTION

This invention relates to an apparatus for tying wire ties about two or more objects and has a particularly valuable application in the fabrication of reinforcing bar panels.

Reinforcing bar panels are made up of a plurality of transverse and longitudinal reinforcing bars assembled into a grid-like module for placement on the construction forms in large sections. Such panels are increasingly being used in the trend toward construction prefabrication in reinforced concrete structures, for example, floors, bridges, dams, highways and buildings. Such panels are typically assembled in jig forms at a location remote from the actual placement location and then moved into position in the concrete form as a module unit. In assembly, reinforcing bars are placed into position on the jig form and then each junction is wire tied.

Typically, reinforcing bar panels are fabricated by hand tying the crossed bars at their intersections with manually formed and twisted wire loops, individually cut from a reel of wire carried by the workman. This hand tying of wire ties is extremely costly in that it takes many man-hours to tie a large quantity of joints.

Hand tying suffers other disadvantages in panel or module construction. These panels must be extra sturdy for handling and placement. Moreover, heavy wire is used for the large bar sizes and uniformly tight joints, preferably on alternate diagonal directions, are required to prevent diagonal racking of the panels and subsequent loosening of wire ties. Moreover, wire ends must be short to prevent tangling when panels are stacked. Loose wire ends can also result in bleeding which is a condition created by the rusting of loose wire extending to or through the surface of the concrete in which they are imbedded. To accomplish the quality fabrication required by these considerations by manual techniques is very clostly in terms of labor.

U.S. Pat. 3,169,559 to Loren F. Working, Jr. discloses a wire tying tool designed to automatically tie crossed reinforcing bars with wire ties or staples. Basically, the patent discloses a hand gun employing a staple ejector mechanism and a twister element. A staple is ejected from the gun over crossed reinforcing bars with the legs of the staple extending outwardly of the bars. The twister element twists the legs together to complete the tie. Two types of twister elements are disclosed. One employs an S-shaped blade adapted upon rotation to engage the legs of a staple and to twist them together. The second twister element includes a plug and cylinder adapted to capture the legs of a staple and to rotate together in the tying of a staple around crossed reinforcing bars.

The wire tying tool disclosed in the Working patent has not proven satisfactory in many respects. The twister elements only twist the legs of a staple together. There is no provision to insure that the staple is firmly seated across the reinforcing bars. As such, completed ties are often loose resulting in poor joint strength. This is true notwithstanding the tendency of a staple to pull against the reinforcing bars as it is being twisted. The lack of panel strength produced from loose ties is a particularly bad condition when the panel must be moved from its fabrication point to its point of use because during movement the panel can experience forces producing its collapse. The tying problem is compounded because there is no provision for correlating the twisting action to desired staple tightness. This is so even with the plug and cylinder twister element because twisting terminates when the gripped portions of the staple's legs are pulled from the cylinder. This means that a wire tie's tightness is determined by the gripped length of the staple's legs which only fortuitously results in a tight connection.

Another problem is presented by the Working staple tying tool. Reinforcing bar panels are made up of several longitudinal and transverse reinforcing bars. A fabricated panel is often moved from its make-up location to its in-use location. This movement requires that the panels have enough strength to resist racking or collapsing. To obtain the required strength it is necessary to tie alternate rows of transverse reinforcing bars across alternate diagonals of the intersecting transverse and longitudinal bars. The Working tool only twists in one direction making alternate, diagonal tying a practical impossibility.

In addition, the staple tying tool disclosed in the Working patent is inflexible in that it may only be used with a limited range of reinforcing bar sizes. Staple tightness is a function of the gripped length of the staple's legs which is a fixed quantity. The spiral tie formed between the twister element and the bottom reinforcing bar is also of fixed length. For this tie to be tight it must extend up to the bottom bar before the ends are pulled from the twister element. Therefore, for even modest tightness the reinforcing bar sizes must be held to within narrow size limits. If the bars exceed too much the nominal diameter required to achieve the minimum twist necessary for a tight tie, the stress in the tie can exceed its ultimate, resulting in tie failure and loose tie ends left in the twisting element to cause subsequent tool jamming.

Moreover, the tool described in the Working patent relies on flutes in the cylinder to engage the legs of the staple in the cylinder and plug type twisting element. The legs of an ejected staple must fall between individual flutes before a tie can be made. However, there is no provision for indexing the flutes with the ejector and therefore a staple can be ejected onto the lands between the flutes causing the tool to jam.

SUMMARY OF THE INVENTION

The present invention provides a wire tying apparatus which tightly draws a generally U-shaped wire tie about the objects to be tied by the application of tension during the twisting operation on the legs of the tie and in preferred form provides the capability of alternate diagonal tying.

In one form the wire tying apparatus includes a magazine for a plurality of generally U-shaped wire ties, removal and positioning means, means for applying tension to the legs of a positioned wire tie, and means for twisting the legs of a positioned wire tie together into a tight spiral. The removal and positioning means is operable to remove individual wire ties from the magazine and to position such a selected wire tie with its crown against one of the objects to be tied and its legs extending beyond the second object. The tension application means draws the legs of a positioned wire tie into intimate contact with the objects.

In preferred form, the twisting means includes a vertically positionable sleeve and clamping head. The sleeve has a cavity sized to accept the legs of a positioned wire tie and the clamping head. Means are provided, such as a cam operated shaft, to position the head in a raised position below the objects and above the cavity. These means are also operable to raise the sleeve with the head to a position where the legs of a positioned wire tie are received in the cavity. Means are also provided to support the sleeve in its tie receiving position independently of the head and sleeve positioning means. In this embodiment the tension means includes a spring which acts on the legs of a positioned wire tie through the head and sleeve when the positioning means is released. Upon release of the positioning means the spring draws the head within the cavity such that the head's radial surface cooperates with a wall of the cavity to clamp the legs of a positioned wire tie while maintaining tension on the tie. The vertical position of the head and sleeve in their clamping mode is then dependent on the tie. Means are provided, such as a geared shaft operating from a rack and connected to the head, to twist the head. By virtue of the clamping action between the head and the walls of the cavity, the sleeve twists or rotates with the head. A space is provided between the head and sleeve in their clamping position and the bottommost object to be tied for developing the tight spiral.

Upon rotation of the head and the sleeve, the tight spiral will be formed with a predetermined tightness. The tightness is determined by the severing of those portions of the tie's legs and the spiral below the initial leg crossover point. After the legs are severed, the tie is complete. The compression spring, after the legs have severed, pulls the sleeve and head downwardly from the tied objects into a position where the head is again above the cavity in the sleeve. This downward action raises the severed portion of the legs from the cavity and rotation centrifugal forces discharge the severed legs from their position on the head.

Preferably, the cavity in the sleeve includes a frusto- conical entrance chamfer to facilitate the entrance of the legs of a selected wire tie into the remaining portions of the cavity. A frusto-conical clamping portion axially adjacent the entrance chamfer is also provided. The taper of the clamping portion diverges towards the entrance chamfer. The head has a clamping portion or skirt which is frusto-conical in configuration. The taper of the frusto-conical clamping portion complements the taper of the clamping portion of the cavity to create a wedging effect when the head is drawn into the cavity to clamp the legs in position to tie.

The wire tie removal and positioning means is preferably in the form of a wire tie ejector assembly which includes a housing in which is journaled a chuck capable of rotating between a first and second position. The first position corresponds to a wire tie orientation across a first diagonal of crossed objects to be tied. The second position corresponds to a wire tie orientation across the second diagonal of such crossed objects. The chuck is operable to accept individual wire tires from the magazine and to hold them in position above the crossed objects. Means are provided, such as a cable-actuated pulley, to rotate the chuck between the first and second positions. Ejector means, such as an ejector shaft, are provided to remove a wire tie held by the chuck and position such tie over either the first or the second diagonal of the crossed objects. Preferably the ejector means is operable to hold the crown of a positioned wire tie against the top of the crossed objects. The shaft may be telescoped into a slidable actuating collar as it is carried by a spring towards the twister head assembly. The telescoping facility enables the accommodation of a broad range of object sizes.

The ejector assembly preferably includes a blade to remove individual wire ties from the magazine for acceptance by the chuck. The blade may be operatively coupled with the ejector shaft such that the two operate in unison to position the wire tie across the crossed objects while removing an individual tie from the magazine for subsequent receipt by the chuck. Wire ties are preferably held in the chuck by magnets disposed to attract the legs of the tie and to center the tie such that its crown can be engaged by the ejector shaft and the legs are in proper position for straddling the crossed objects. For proper and accurate positioning the magnets are preferably arranged near the ends of the chuck in such a way that they exert a sufficient attracting force concentrated at four areas on the chuck surface. This assures the proper positioning of the wire tie on the face of the chuck because each leg of the tie is held in accurate position by two magnetic force points. This is particularly significant when the wire ties removed from the magazine must rotate to their diagonal first or second position.

A guide is preferably provided which is fixed to the bottom of the chuck and journaled in the housing. The guide has an opening for the passage of the ejector shaft and a wire tie. The opening is configured such that narrow channel-like portions guide the legs of a wire tie as they pass through the guide in response to the ejector shaft.

The ejector assembly also preferably includes means for preventing a loose staple from the magazine from passing onto the chuck before it is time to do so. The provision of such means is necessary because, while staples in the magazine are usually bonded together, occasionally a loose staple is present. The loose staple retention means can comprise a spring-loaded detent in the path of the blade which holds the loose staple until the blade acting on the crown of the staple depresses the detent.

In assembled form, the invention contemplates the mounting of a plurality of ejector assemblies, magazines and twister head assemblies on a frame in spaced-apart relationship. These assemblies are mounted such that they fall along a line of a transverse reinforcing bar and in position to tie such a bar to a plurality of axial reinforcing bars. The construction details of the individual units are the same as previously described. However, provisions are made to facilitate the simultaneous tying of the transverse reinforcing bar to the axial reinforcing bars in an accurately predictable manner. One such provision is a common drawbar operable to act on the ejector shafts of each individual ejector assembly to depress the shafts and position a tie at each intersection of the transverse reinforcing bar and axial reinforcing bars. To facilitate accurate rotation of the chuck between its first and second position, a pulley is provided for each chuck which may be attached to and form a part of the guide assembly. The pulley is actuated by a cable which is drawn along the surface of the pulley to rotate the chuck. To maintain the required friction force between the cable and the pulley to insure the accurate rotation of each of the chucks, spring-mounted, idler rollers may be provided on either side of each pulley to pull the cable tightly against the pulley's surface. The twister head assemblies are also operated in unison through, for example, a common torque shaft and camming plate. Rotation of the torque shaft rotates the camming plate and raises the head and sleeve of each twister head assembly into their tie receiving position.

The present invention has many advantages as a wire tying apparatus and solves the problems inherent in wire tying tools of the type disclosed in U.S. Pat. No. 3,169,559 to Loren F. Working, Jr.

Initially, a wire tie is always drawn tightly by the tension means around the objects to be fastened. The applied tension insures that the tie crown is properly seated and formed in intimate contact with the objects. As such, a tie will not be tied loose or later slip and become loose. Moreover, tightness is directly correlated to the twisting action and maximum wire strength because twisting terminates only when the gripped portions of the tie's legs are severed in the formed tight spiral. Severing occurs in the formed spiral at the initial leg crossover point when the spiral tightens against the objects. Further twisting raises the spiral tension forces in the wire above the maximum tensile strength of the wire, resulting in wire breakage and severance of the gripped legs. Tightness correlation to twisting and wire strength insures that each wire tie is tied to the same degree of tightness. In reinforcing bar panel fabrication this constancy of tightness insures strength reliability in the finished product permitting fabrication at other than on-use site locations. The severing of a tie in its spiral assures that only a short portion of the tie extends from the panel. The short extension normally prevents bleeding and panel tangling.

Previously no provision has been made to apply tension to the legs of a staple by the twisting mechanism. Twisting terminates when the engaged portion of a staple's legs leaves a cylinder or rises above an S-shaped twisting blade. Tightness was then a quality dependent solely on the length of engagement between the twisting mechanism and a staple's legs. Therefore, the degree of staple tightness was, at least, only indirectly monitored and tightness reliability was not an assured quality. On the other hand, the wire tying mechanism of the present invention always applies tension to the legs by the positive grip of the tensioning means and terminates the tying process upon the severing of the legs in the formed tie spiral. Thus, tightness is no longer a capricious quality, but instead is a function of the stresses in the wire tie produced by tension and twisting.

In addition, the wire tying apparatus of the present invention is capable of tying objects of various sizes with a single staple size without loss of tightness or special adjustments. This is because a tie is not completed until severing of its legs. Because severing is a function of the stresses in the wire tie the effect of various sized objects on tightness is minimal. Moreover, with the telescoping ejector shafts there is a broad size accommodation, because ejection and positioning of a wire tie are not dependent on object distance to the ejector assembly. Previously, tightness has been dependent upon the length of legs engaged by the twisting mechanism and therefore there has been a limited object size accommodation available if the spiral formed was to have sufficient wire to run up against the bottom object.

Moreover, the problem of tool jamming during staple ejection is substantially reduced because the present invention, in its preferred form, relies on a clamping action produced by its head drawing into the cavity of its sleeve to maintain the gripped portions of a wire tie's legs in their twisting orientation. This wedging type action between two relatively smooth objects avoids the requirement of indexing which would be required with flutes if jamming is to be avoided. The problem of concrete bleeding is also eliminated because the free ends of the wide tie are severed from the spiral during the tying process.

Another important feature of the present invention insures that fabricated reinforcing bar panels have sufficient strength for transportation from their fabrication point to their point of use. This is provided by the facility of alternate diagonal tying of wire ties between successive rows of transverse reinforcing bars. By providing the wire tying apparatus with means to shift wire tie orientation from one diagonal to the other and correlating the twisting action with the direction of tie placement a very rigid panel can be produced.

These and other features, aspects and advantages of the present invention will become more apparent from the following description, appended claims and drawings.

DESCRIPTION OF THE PREFERRED EMBODIMENTS

Figure 1:
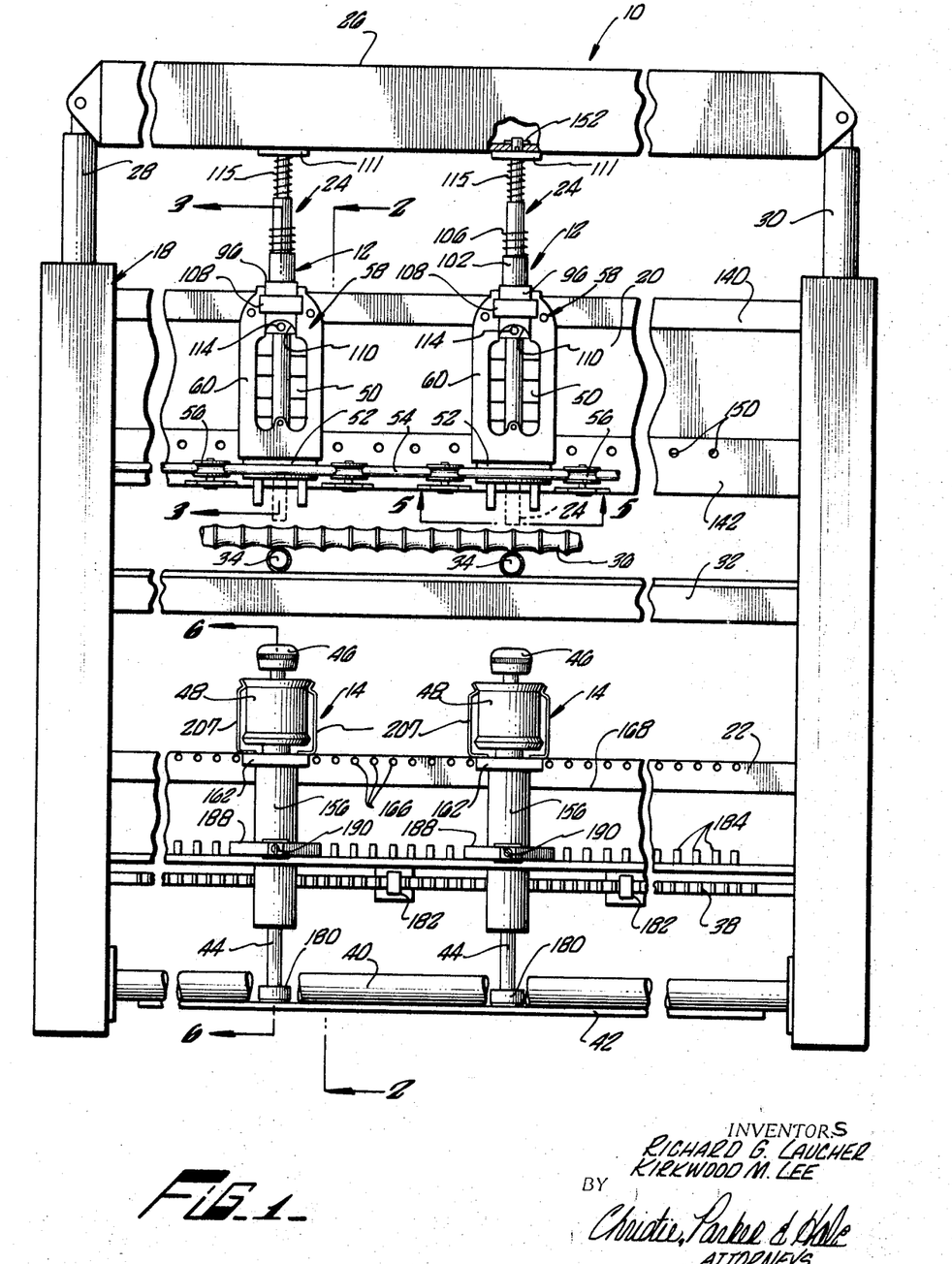
FIG. 1 is a partial, frontal elevation of a wire tying apparatus employing a plurality of wire tying units in accordance with the present invention.
Figure 2:
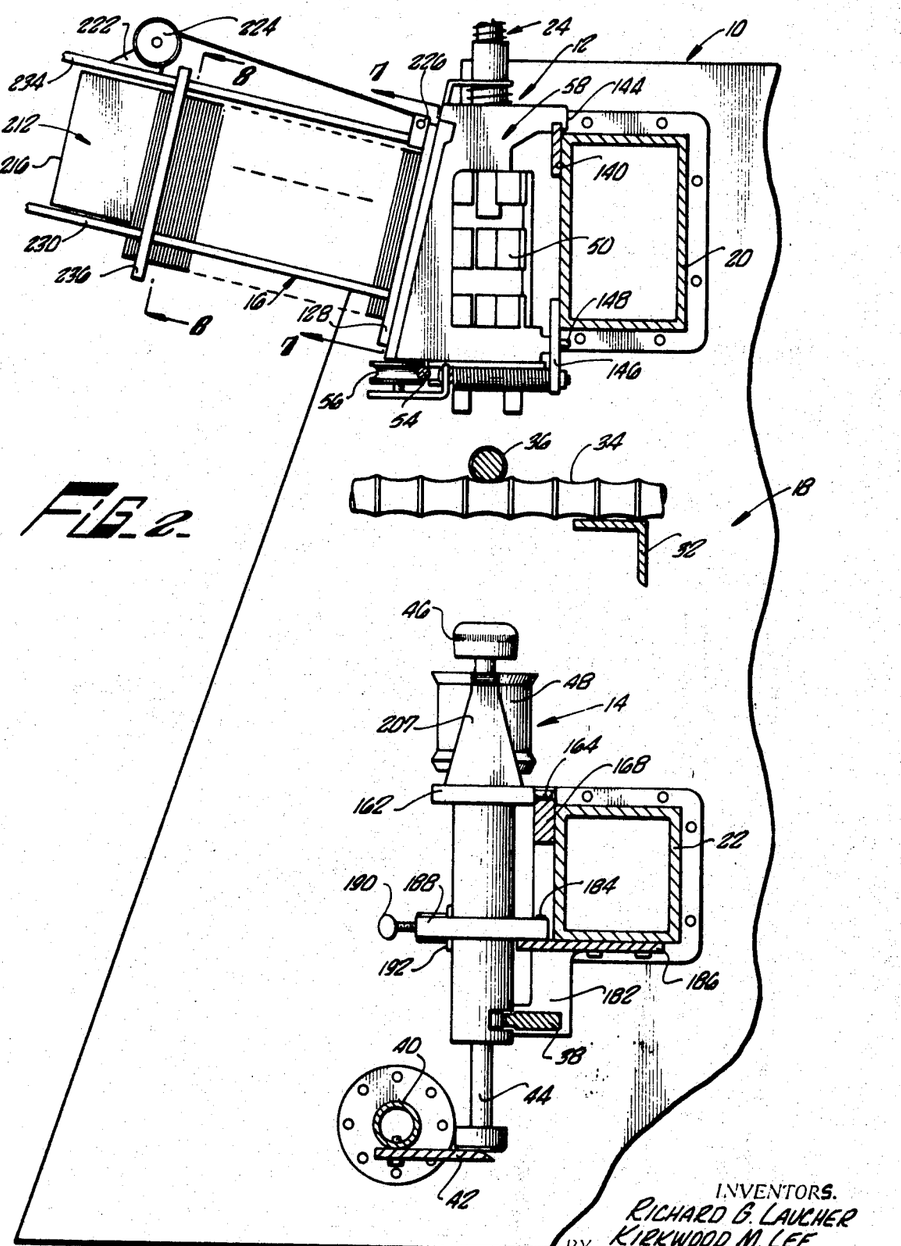
FIG. 2 is a side elevation of the embodiment shown in FIG. 1, partly in section, taken along line 2—2 of FIG. 1.

The wire tying apparatus of the present invention will initially be described in general terms with reference to FIGS. 1 and 2.

In these figures the apparatus itself is depicted by reference numeral 10. The apparatus includes a plurality of ejector head and wire tie positioning assemblies 12 and a corresponding number of twister head assemblies 14. As seen in FIG. 2, a wire tie magazine 16 is provided to supply wire ties to each of the ejector head assemblies.

A frame 18 supports the ejector head assemblies, twister head assemblies and magazines. Each ejector head assembly 12 is supported above a corresponding twister head assembly 14 on a cross beam 20 of frame 18. Twister head assemblies 14 are supported on frame 18 by connection to a second cross beam 22 of the frame.

Each of the ejector head assemblies includes a wire tie ejector shaft 24 to position wire ties across positioned reinforcing bars. A drawbar 26 is engaged with the ejector shafts for their actuation. The drawbar is actuated through a pair of pneumatic cylinders having a pair of drive shafts 28 and 30. Shafts 28 and 30 are connected to the drawbar. Pneumatic cylinders drive shafts 28 and 30 and are therefore responsible for actuating ejector shafts 24. Shafts 28 and 30 are mechanically coupled together by a horizontal torque shaft and cranks 26a (FIG. 9) to insure that drawbar 26 raises and lowers in a horizontal attitude.

A reinforcing bar support beam 32 is connected to the balance of frame 18 at its ends and supports a plurality of longitudinal reinforcing bars 34. Through the longitudinal reinforcing bars, support beam 32 also supports a transverse reinforcing bar 36.

As will subsequently be developed, twister head assemblies 14 are rotationally actuated by individual gears which mesh with a rack type drive gear 38. Rack gear 38 is capable of being driven in both directions to provide both clockwise and counterclockwise twisting action. Twister head assemblies 14 are brought to their tying position by rotation of a torque shaft 40. Torque shaft 40 is actuated by a pneumatic cylinder through a crank. Camming plate 42 is secured to shaft 40 and rotates with the shaft. Each of the twister head assemblies includes a shaft 44, a clamping head 46 and a sleeve 48. Each sleeve has a cavity to receive its associated head and the legs of a wire tie. When camming plate 42 rotates, each of the shafts 44 raises and carries its associated head and sleeve to their upper positions ready to receive an ejected wire tie.

Each ejector head assembly 12 has the capability of rotating a wire tie 90° between successive tyings of transverse to longitudinal reinforcing bars. This 90° rotational facility allows the positioning of a wire tie across either of the diagonals of the intersecting reinforcing bars. The rotational positioning is determined by the attitude of a magnetic chuck 50 in each of the assemblies. These chucks are driven between 90° stops through pulleys 52 which are in turn driven by a tensioned cable 54. Spring biased tension idlers 56 are disposed on either side of the pulleys and connected to cross beam 20 to maintain intimate contact between cable 54 and the pulley grooves of pulleys 52. This insures proper and accurate rotation of each of the chucks 50.

Figure 3:
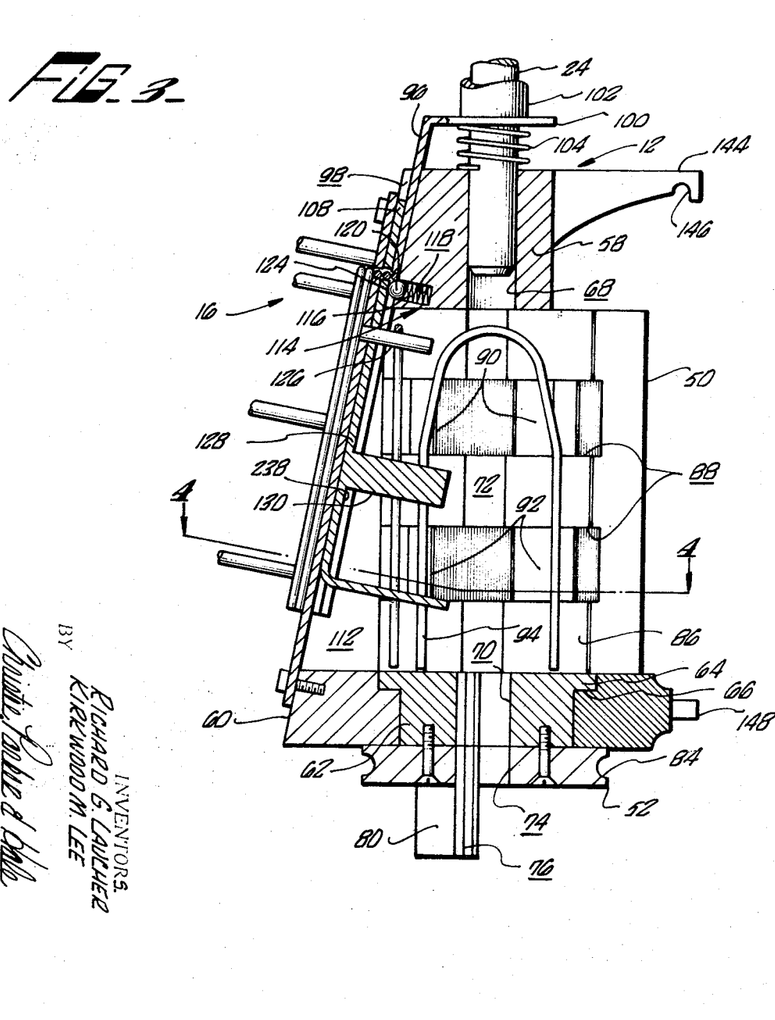
FIG. 3 is a view taken along line 3—3 of FIG. 1 showing the preferred ejector assembly partly in half section.
Figure 4:
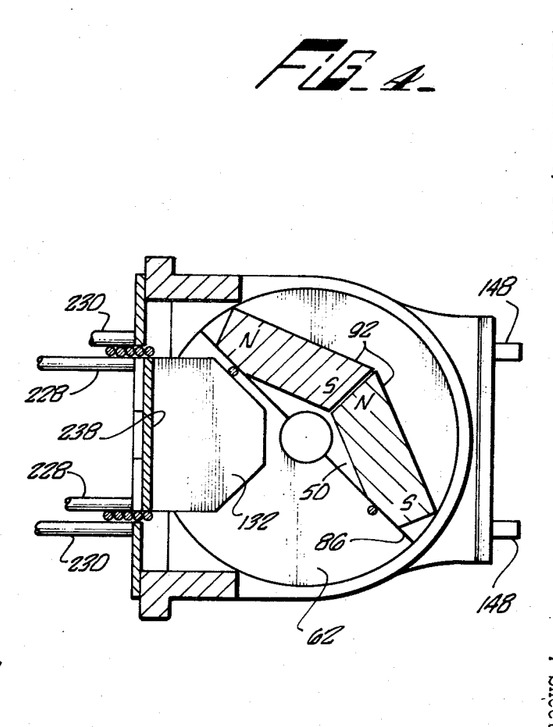
FIG. 4 is a view taken along line 4—4 of FIG. 3.
Figure 5:
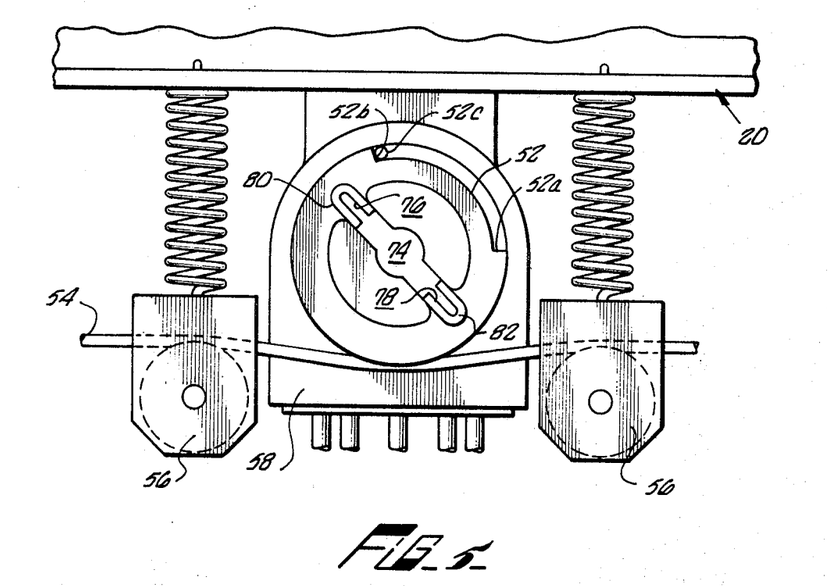
FIG. 5 is a bottom view taken along line 5—5 of FIG. 1 of the ejector assembly of FIGS. 3 and 4 and a portion of its attendant drive.

FIGS. 3 and 4 depict in more specific form an ejector head assembly 12. The ejector head assembly includes a housing 58 which has a canted magazine receiving surface 60. Magnetic chuck 50 is journaled for rotation in housing 58. Mounting is provided by a rotatable base 62. Base 62 includes an annular flange 64 which mates in bearing relationship with annular step 66 of housing 58. Chuck 50 is fixed to base 62 as is pulley 52. Housing 58 includes an axial bore 68 for ejector shaft 24. Base 62 also has an axial bore 70 which is aligned with bore 68. Chuck 50 has a passage 72, generally semicircular, which is aligned with bores 68 and 70. Ejector shaft 24 is laterally supported by housing 58 in bore 68 before actuation. Shaft 24 passes through this bore as well as passage 72 and bore 70 when it is called upon to eject a wire tie. Pulley 52 also has a bore 74. As seen to best effect in conjunction with FIG. 5, bore 74 provides for the passage of ejector shaft 24 in the positioning of a wire tie over crossed reinforcing bars. Narrow channel-like apertures 76 and 78 extend on diametrically opposite sides of bore 74 for the passage of a wire tie. A tie is further guided by the provision of a pair of guide bosses 80 and 82 which depend downward from pulley 52. The guide bosses include a portion of channel-like apertures 76 and 78. Pulley 52 includes an annular pulley surface 84 for engagement with cable 54. Pulley 52 is recessed along its periphery to furnish 90° rotation stops 52a and 52b for stop pin 52c (FIG. 5). Pin 52c is mounted in the base of housing 58.

Chuck 50 has a generally flat wire tie receiving face 86. Lateral cutouts 88 are provided in the receiving face 86. A first magnet pair 90 is disposed in the upper cutout. A second magnet pair 92 is disposed in the lower cutout. Each magnet pair includes a north and a south pole with the north pole of one magnet and the south pole of the other magnet abutting in the center of the chuck as is shown in FIG. 4. This orientation of the magnets provides for accurate positioning of a wire tie such as wire tie 94 shown on face 86. The complementing poles on the left side of passage 72 initially attract a wire tie removed from magazine 16. The attraction provided by the left side magnets causes the left leg of the tie to come into contact with the left side of the face. Face 86, however, is at a 45° angle to the plane of a wire tie about to be attracted to it. Upon rotation of chuck 50 through 90° to a position on the alternate diagonal, the right leg of the wire tie is close to the right side of face 86, and is drawn into position by the magnetic force field. The chuck must rotate this 90° to pick up the right leg of the tie because shaft 24 is between the tie and the center of the chuck. When the chuck rotates 90°, the shaft clears the chuck to admit to full contact of the tie on the chuck's face. The chuck itself, other than magnet pairs 90 and 92, is formed of a nonmagnetic material such as aluminum in order not to affect the attracting force field produced by the magnet pairs.

The removal of wire ties from magazine 16 and the accurate positioning of a removed tie onto face 86 is best understood by reference to FIG. 3. Ejector head assembly 12 includes a blade 96 which is slidably disposed in channel 98 of housing 58. Blade 96 includes a horizontal portion 100 which has a U-shaped cutout, not shown, for passage of ejector shaft 24. The U-shaped cutout allows lateral movement of horizontal portion 100 with respect to shaft 24 when blade 96 is actuated. A collar 102 abuts horizontal portion 100 and is actuated by drawbar 26 through a slidable collar 111 (shown in FIGS. 1 and 2). Shaft 24 is slidable through collar 102. Buffer spring 104, held by shaft 24, cushions the impact of horizontal portion 100 against the upper surface of housing 58 and maintains blade 96 clear of the wire tie passage between magazine 16 and chuck 50. Buffer spring 106, disposed about shaft 24, provides a similar function to cushion the impact of collar 111 on collar 102. A guide 108 spans channel 98 to maintain the proper orientation of blade 96. As is seen in FIG. 1, blade 96 includes an arcuate driving surface 110 which is configured to match the curved surface of the crown of a wire tie. Channel 98 extends from the top of housing 58 along attachment surface 60 to tie passage 112 and is sized to allow the passage of a wire tie from magazine 16 into tie passage 112.

As seen in FIG. 1, shaft 24 in conjunction with drawbar 26 provides a telescoping effect. A spring 115 rests against an annular shoulder on shaft 24 and urges against collar 111 to couple the latter to the drawbar. When drawbar 26 depresses, it forces collar 111 downward. Through spring 115, shaft 24 follows the downward movement of collar 111 to eject a wire tie from chuck 50 and position the tie over reinforcing bars 34 and 36. The tip of shaft 24 holds the tie in this position. With continued downward movement of drawbar 26, shaft 24 telescopes into the central cavity of the drawbar. This telescoping effect provides a sizing accommodation for various diameter reinforcing bars because the top of shaft 24 is not rigidly coupled to drawbar 26.

Magazine 16 is adapted to receive a multiplicity of wire ties. These wire ties are normally bonded together and must be severed from the bundle of ties for their proper positioning on chuck 50. Nonetheless, an occasional loose wire tie invariably is present. Provision must therefore be made to prevent the inadvertent passage of a loose wire tie into tie passage 112 before the operational sequence demands such positioning. To prevent such errant excursions, a spring-loaded detent is provided which is shown generally by reference numeral 114 in FIG. 3. The detent includes a spring 116 which is received in a hole 118 in housing 58. The detent itself is shown by reference numeral 120 and is held in place by a plate 128. Detent 120 includes a generally rounded ball 124 which extends into channel 98. As a wire tie is received in channel 98 and in the event that such tie is loose, detent 120 prevents its passage until such time as blade 96 drives the tie down the channel to overcome the action of spring 116 and depress detent 120.

As is seen in FIG. 3, the course of a severed wire tie after its removal by blade 96 is guided by an inclined dowel pin 126 as it enters passage 112. Dowel pin 126 is secured in mounting plate 128 and inclined inwardly and slightly downwardly towards chuck 50. The dowel pin is at the midpoint of passage 112 in position to provide a slide for the crown of a wire tie. The angle of the pin allows a wire tie to slide down it towards receiving face 86 of chuck 50. The legs of a severed tie are guided in this course by guide members 130 and 132 which are configured to guide the inner surfaces of a wire tie. Thus the path of a wire tie severed by blade 96 from a bundle of ties housed in magazine 16 begins by passage through channel 98 to tie passage 112. When it reaches passage 112, the tie will be under the influence of gravity and the magnetic field produced by magnetic pairs 90 and 92. The course of the tie is then downwardly and inwardly towards face 86.

Figure 7:
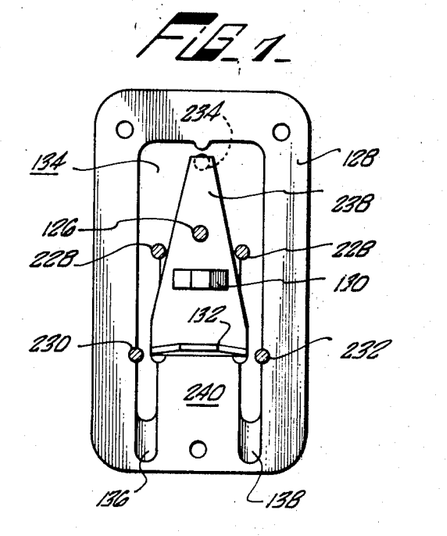
FIG. 7 is and end elevation view taken along line 7—7 of FIG. 2 showing the connecting plate of the preferred wire tie magazine.

Mounting plate 128 is shown in greater detail in FIG. 7. The plate is the inward terminus of magazine 16. A cutout portion 134 is in plate 128 for the passage of individual wire ties. Ties are guided in their entrance into passage 112 by a pair of sloping guide surfaces 136 and 138 at the bottom of cutout portion 134. These surfaces provide a track for the ends of a tie's legs. Guide members 130 and 132 narrow in horizontal cross section as the members reach into passage 112. This narrowing provides room from the rotational path of chuck 50.

The lateral spacing between individual ejector head assemblies and their carried magazines may be varied. This feature is depicted in FIGS. 1 and 2. Cross beam 20 includes upper and lower mounting plates 140 and 142 respectively. Mounting plate 140 extends slightly upward from the top of beam 20 proper. Ejector head assembly 12 includes a pair of mounting lugs 144 on either side of housing 58. These lugs include a notch 146 (FIG. 3) which adapts the lugs for engagement to mounting plate 140. The bottom of housing 58 includes mounting dowels 148. These dowels are received in holes 150 in lower mounting plate 142. The holes are regularly spaced such that each ejector head assembly may be mounted through its dowel pairs at incremental positions along beam 20.

The lateral positional facility of the ejector head assemblies is completed by a plurality of spaced-apart holes in drawbar 26 for receiving each of the ejector shafts 24. These holes are indexed with mounting holes 150 to provide correct vertical orientation of each ejector head assembly 12. As seen in FIG. 1, each of the ejector shafts 24 extends into one of these holes and is held in place by pin 152. Collar 111 cooperates with pin 152 in coupling ejector shaft 24 in drawbar 26. To provide for the passage of pin 152 into the hole, a pair of diametrically opposed slots opening into the hole are provided. Coupling is provided by simply twisting the shaft and hence the pin such that the pin is out of register with the slots.

Figure 6:
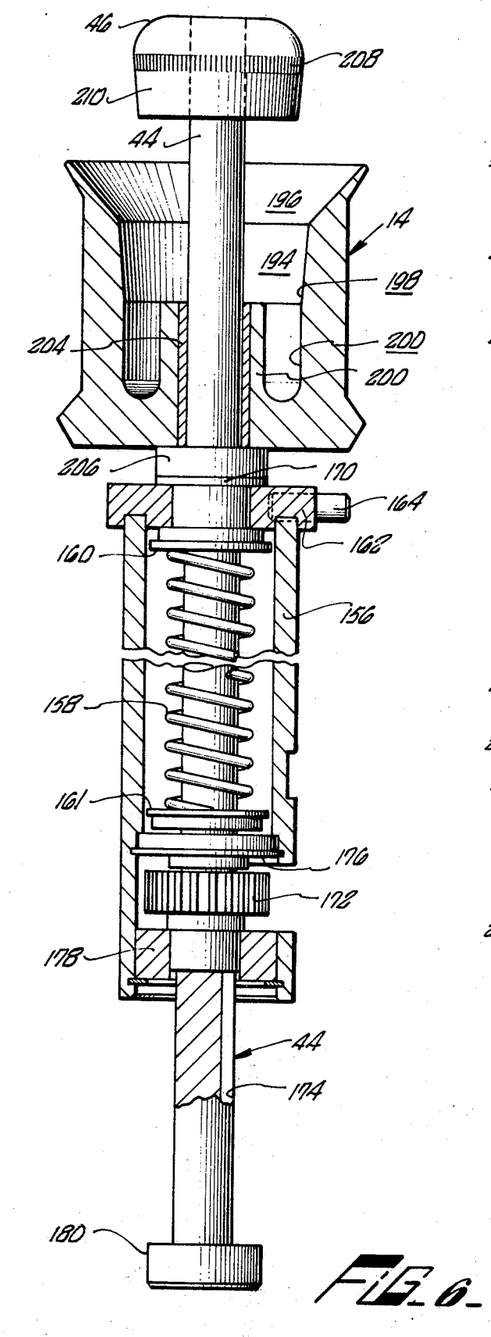
FIG. 6 is a view, partly in half section, of the twister head assembly of FIG. 1 taken along line 6—6 of FIG. 1.

Twister head assembly 14 will now be described with reference to FIG. 6 in particular and with occasional reference to FIGS. 1 and 2. Twister head assembly 14 includes a barrel 156. A compression spring 158 is disposed within barrel 156 and around shaft 44. A washer 160 is provided at the upper end of spring 158 for bearing, and is slidable on shaft 44. A collar 161 is provided to compress spring 158 when shaft 44 is raised vertically to the wire tie receiving position. Collar 161 is keyed to shaft 44 for this purpose. Barrel 156 is capped by a generally rectangular cover plate 162. A pair of spaced-apart mounting dowels 164 depend from cover plate 162 for mounting the twister head assembly to cross beam 22 in a pair of the holes 166 in mounting plate 168. The holes in the mounting plate are shown in FIG. 1. Holes 166 are indexed with holes 150 of mounting plate 142 to provide for the proper vertical alignment of individual twister head assemblies with their cooperating ejector head assembly. A bushing 170 is provided in cover plate 162 for shaft 44. A gear 172 is keyed to shaft 44 by a keeper, not shown, which is retained in vertical keeper slot 174. Gear 172 is held vertically in place by retainer 176. This retainer is fixed in barrel 156. A plug 178 fixed in the lower portion of barrel 156 complements retainer 176 in maintaining the gear in a fixed vertical position. Both retainer 176 and plug 178 have a bore for the passage of shaft 44. Shaft 44 is capable of vertical movement with respect to gear 172 and barrel 156. Vertical movement is provided by the action of camming plate 42 on a lifter 180 fixed at the lower terminus of shaft 44. Gear 172 is driven in rotation in either a clockwise or counterclockwise direction by rack 38 shown in FIG. 1. Rack 38 is supported on cross beam 22 by a plurality of rack mounting brackets 182.

The mounting of barrel 156 and hence twister head assembly 14 is also shown in FIGS. 1 and 2. A plurality of vertically disposed mounting lugs 184 are attached to a horizontal mounting plate 186 which in turn is attached to cross beam 22. A clip 188 is disposed about mounting lugs 184 and extends across the front of barrel 156. Clip 188 is made fast against barrel 156 by a tensioning screw 190 which is received in threads of a nut, not shown, in the clip and bears at its barrel end on tab 192. The barrel is mounted at its top to beam 22 through dowels 164. These dowels are received in holes 166 of mounting plate 168 as described previously. Lateral positioning is then easily accomplished by simply loosening the clips, disengaging dowels 164 and moving the twister head assembly to the desired location.

Twister head assembly 14 further includes a sleeve 48 and a clamping head 46. Sleeve 48 has a centrally disposed cavity 194 for receiving the legs of a wire tie between the wall of the cavity and the radial wall of head 46. The cavity includes a frusto-conical entrance chamfer 196 which diverges towards the mouth of the cavity. The entrance chamfer facilitates the entrance of the legs of a wire tie into the cavity proper. The cavity further includes a frusto-conical clamping portion 198 which also diverges towards the mouth of the cavity but with a considerably smaller amount of divergence than that of the entrance chamfer. The cavity is completed by an annular cylindrical portion 200 for the extreme ends of a wire tie. Sleeve 48 further includes a boss portion 202 for the sleeve's mounting on shaft 44. A bushing 204 is disposed between boss 202 and shaft 44. A collar 206 is provided to lift sleeve 48 into a wire tie receiving position. The collar is keyed to shaft for this purpose. A pair of diametrically opposed spring clips 207, seen in FIG. 1, are mounted at their lower ends on cover 162. These clips are tapered from their bottoms towards their tops to resist rotation of sleeve 48 in its lower position. The free end of each clip extends slightly inwardly towards the axis of sleeve 48 and then outwardly to form a seat for the bottom of the sleeve. The clips displace outwardly to allow sleeve 48 to pass upwardly of barrel 156 to its tie receiving position. The return of clips 207 to their normal position engages the bottom of the sleeve to maintain it in the tie receiving position.

Clamping head 46 includes a serrated gripping portion 208 at substantially its major diameter. A skirt 210 depends below the gripping portion. Skirt 210 has a taper which complements the taper of clamping portion 198 in sleeve 48 to create a wedging effect on the legs of a positioned wire tie. Head 46 is rigidly affixed to shaft 44 to follow the latter's vertical movement.

Figure 8:
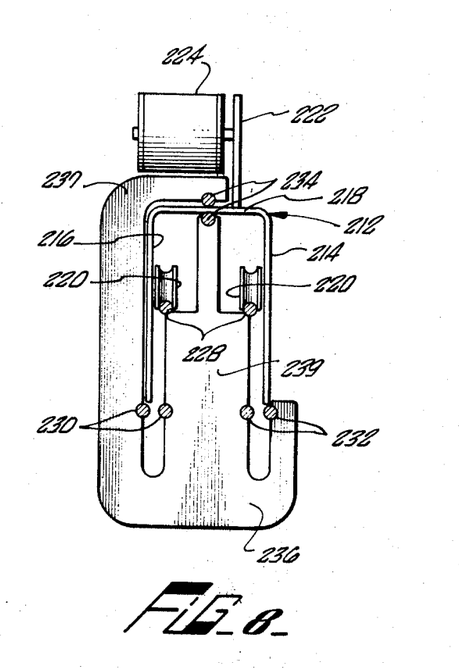
FIG. 8 is a view taken along line 8—8 of FIG. 2 showing the wire tie magazine, guides and feeding means.

Magazine 16 will now be described with reference to FIGS. 2, 7 and 8. The magazine includes a trolley 212 for maintaining a pack or bundle of wire ties in position for individual tie removal by ejector head assembly 12. Trolley 212 is generally U-shaped with vertical sides 214 and 216 depending downward from and held together by a horizontal portion 218. A pair of rollers 220 are rotatably attached to sides 214 and 216. A mounting bracket 222 extends upwardly from horizontal portion 218 and to one side of the centerline of the trolley. A constant tension spring 224 is attached to mounting bracket 222 and to housing 58 at a bracket 226. Constant tension spring 224 urges trolley 212 and its carried wire ties inwardly toward ejector head assembly 12. Magazine 16 includes a pair of parallel tracks 228 for rollers 220. In addition, the magazine includes pairs of left and right guide dowels 230 and 232. The guide dowels are spaced apart to allow passage of wire ties while keeping them in proper position. The dowels also serve as framing for the magazine. A pair of crown guide dowels 234 are provided for the crown of the wire ties. These dowels, as well as parallel tracks 228, also provide framing for the magazine. A plurality of regularly spaced, plate-like supports 236 are provided for the guiding dowels and tracks. These supports are cut out to allow passage of wire ties and trolley 212. As seen in FIG. 8, the cutout is irregularly shaped to provide free passage of mounting bracket 222 as it traverses the length of the magazine. The cutout is bounded in part by a horizontal flange portion 237 which provides a support for the upper one of crown dowel guides 234. A center portion 239 of plate 236 provides anchorage for the lower one of the crown guide dowels, tracks 228 and the inner dowel of lower guide dowels 230 and 232. Center portion 239 extends inwardly from its meeting with rails 228 from a point below the top of the rails to provide clearance for the inner flanges of rollers 220. It then extends upwardly for the mounting of the lower of crown dowel guides 234.

The inner terminal end of magazine 16 includes mounting plate 128. This plate is shown in plan in FIG. 7. As was previously described, dowel pin 126 and guide members 130 and 132 depend inwardly from the plane of mounting plate 128 to guide the wire ties in their travel into tie passage 112. These members are attached to or form a part of mounting member 238 which in turn is attached to backing member 240. For proper mounting, the inner terminus of the guide dowels and trolley track is at mounting plate 128.

Figure 9:
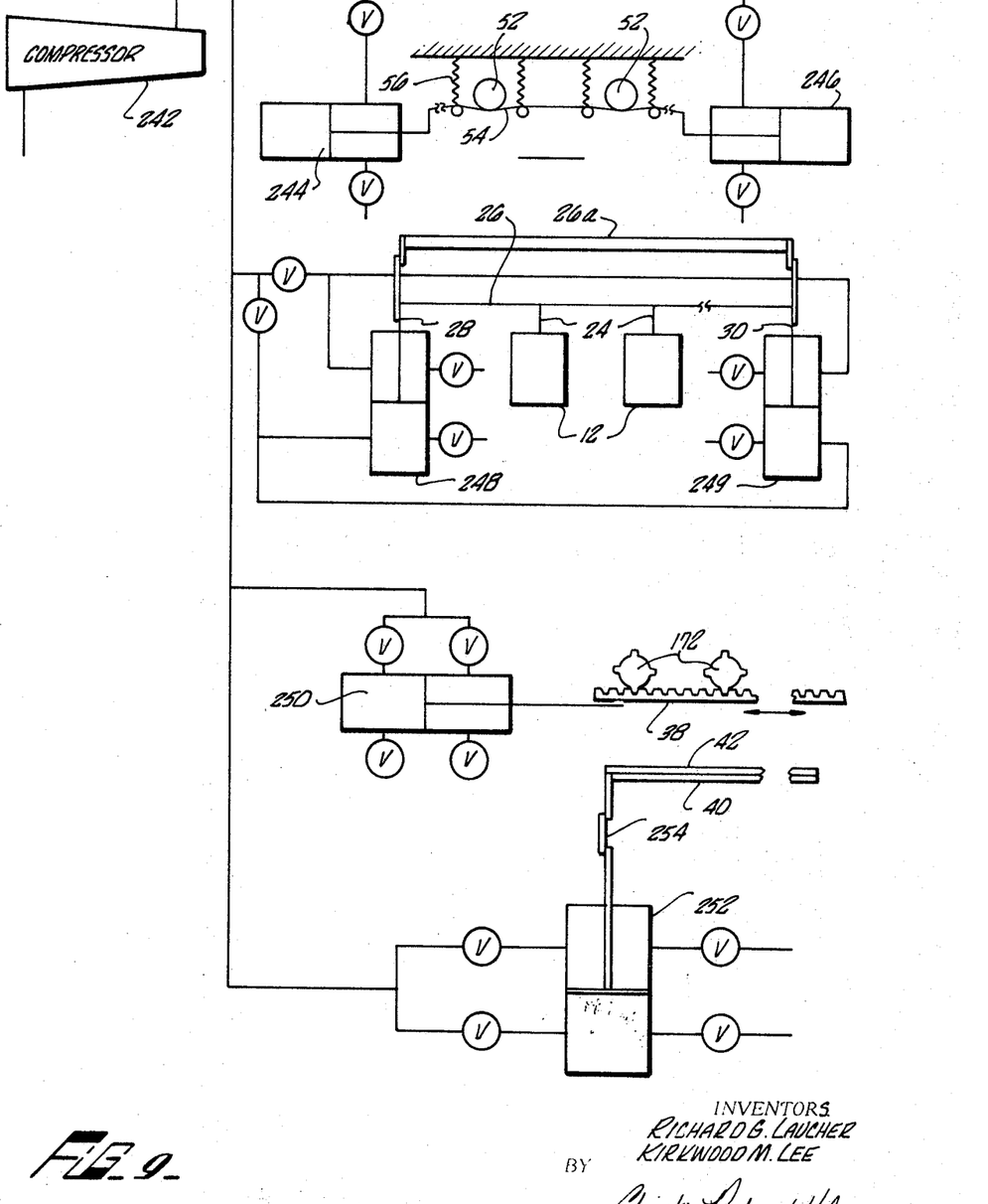
FIG. 9 is a simplified schematic view of the power system used to operate the apparatus shown in FIGS. 1 and 2.

FIG. 9 depicts the power system preferably employed in the wire tying apparatus of the present invention. This power system is shown schematically and simplified somewhat for the purposes of clarity. Basically, the power system includes a source of compressed air such as a compressor 242. A pair of air-actuated pneumatic pistons and cylinders 244 and 246 are provided to drive cable 54. These piston assemblies are air-biased in opposite directions to maintain tension on cable 54 at all times. As was previously pointed out, the tension is required to insure proper rotation of the chucks in the ejector head assemblies. When it is desired to rotate the chucks, say to the right, a pressure differential is created between the power sides of cylinders 246 and 244 which urges the piston in cylinder 246 to the right. Conversely, a pressure differential may be created between the cylinders which moves the piston to the left. Tension is maintained on cable 54 by air pressure in the two piston assemblies. However, to insure proper cable contact with the various pulleys of the ejector head assembly, the plurality of regularly spaced spring-biased idlers are provided. These idlers were previously described and are indicated by reference numeral 56. The degree of travel right or left of cable 54 is in excess of that required to rotate the chucks in order to compensate for any slippage between cable 54 and various of its driven pulleys 52.

Drawbar 26 is also pneumatically actuated by a pair of pneumatically actuated pistons and cylinders 248 and 249. The power and damping chambers of the pneumatic cylinders are in pneumatic communication and work in conjunction with torque shaft 26a to maintain drawbar 26 horizontal during actuation and therefore effect uniform travel of all of the ejector shafts 24. The twister head assemblies are driven in rotation either clockwise or counterclockwise through their gears 172. These gears are in turn actuated by rack gear 38. Desired clockwise or counterclockwise motion is provided by double acting pneumatic cylinder 250. Pneumatic cylinder 252 controls torque shaft 40 and its camming plate 42 through a crank 254.

OPERATION

Figure 10:
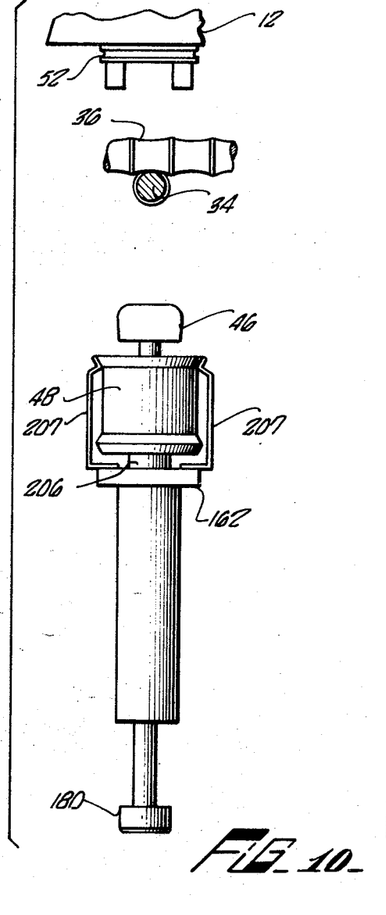
FIGS. 10 through 12 depict a tying sequence of the apparatus shown in FIGS. 1 and 2.
Figure 11:
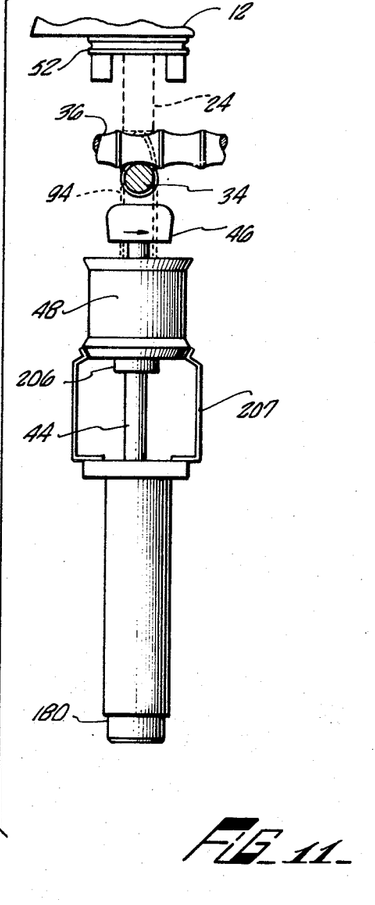
Figure 12:
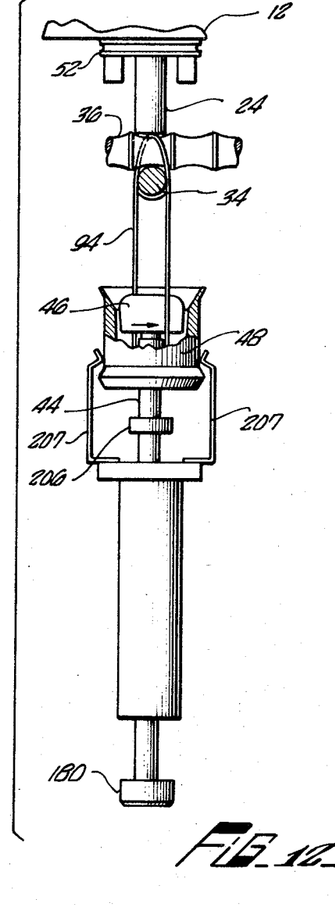

The operational sequence of the twister head assembly is depicted in FIGS. 10 through 12. Before discussing this sequence it is necessary to discuss the action of the twister head assembly on the wire ties. As was previously pointed out, individual wire ties are driven into a tying position by ejector shaft 24 of ejector head assembly 12. Chuck 50 orients the tie at a generally 45° angle to the axes of the intersecting transverse and longitudinal reinforcing bars. The twisting action is preferably such that as the legs of a tie are rotated in response to the twister head assemblies, the legs will initially encounter the reinforcing bar which is closest to the wire tie's crown. In the diagonal orientation shown in FIG. 12, the twister head assembly must rotate in a counterclockwise direction because the diagonal orientation of a tie 94 is such that its legs would otherwise encounter longitudinal reinforcing bar 34 before transverse bar 36. An initial encounter with reinforcing bar 34 produces a condition where the tie could grip the bars' ridges and tie loosely. Twisting in a counterclockwise direction, in short, insures that the tie will be in a trough between the ridges of the bars. Thus the diagonal orientation of a wire tie 94 produced by the rotational orientation of chuck 50 is coupled with the rotational attitude of twister head assembly 14 to provide the necessary direction of twist. This coupling may be done in any number of ways.

With this understanding a typical operational sequence will now be described.

Before wire ties are ejected by the ejector head assemblies, each twister head assembly appears as illustrated in FIG. 10. In this position, sleeve 48 rests on collar 206 which in turn rests on cover 162. Head 46 is just above the sleeve but well below crossed reinforcing bars 34 and 36.

Individual wire ties 94 are properly oriented by chuck 50 in each of the ejector head assemblies 12 on a 45° bias with respect to the axes of reinforcing bars 34 and 36. Pneumatic cylinder 252 is then actuated to rotate torque shaft 40 and cam plate 42. Cam plate 42 will bear on lifter 180 to raise sleeve 48 and clamping head 46 into their tie receiving positions. Sleeve 48 is carried through collar 206 by shaft 44 and is engaged by leaf spring clips 207. In the attitude shown in FIG. 11, clamping head 46 is disposed above sleeve 48. The ejector shaft 24 will then be actuated by pneumatic cylinders 248 and 249 which depress drawbar 26. Wire ties will leave each ejector head assembly and be held in position over the crossed reinforcing bars by the end of ejector shaft 24. This attitude is shown in FIG. 11. Wire tie ejector shaft 24 bears on the crown of wire tie 94 to maintain it in place. The legs of wire tie 94 extend into the cavity of the sleeve.

When cam plate 42 returns to its inactivated position, compression spring 158 acts on head 46 to draw it within the cavity of sleeve 48. This orientation is shown in FIG. 12. Sleeve 48 is now uncoupled from shaft 44 by virtue of the lowering of collar 206 with the shaft. The legs of tie 94 are firmly clamped by a wedging action between head 46 and the wall of the cavity of sleeve 48. These clamped legs maintain the head and sleeve in their twisting position. Spring clips 207 function to maintain the raised sleeve position until clamping is effected. After the wire tie is clamped, shaft 44, activated by compression spring 158, stretches the wire tie's crown firmly around bar 36 and maintains a tension on the wire tie's legs in conjunction with head 46 and sleeve 48. After clamping, sleeve 48 drops below the detent of spring clips 207. The crown of the tie is still held by shaft 24. In the orientation shown in FIG. 12 a twisting space is present between reinforcing bars 34 and the top of sleeve 48 and head 46. Within this space the tight spiral is formed. Rack 38 is then driven to impart counterclockwise rotation to head 46 to develop the tight spiral tie. With rotation of head 46, sleeve 48 also rotates because it is coupled to the head through the clamped legs of the wire tie.

Figure 13:
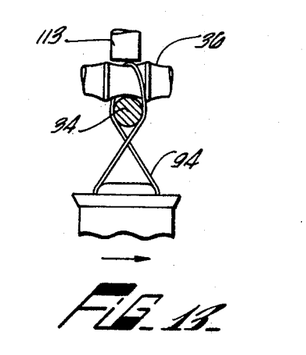
FIGS. 13 through 15 further depict a tying sequence showing the formation of a tight spiral tie without free ends.

In FIG. 13 the initial stages of the tying action are illustrated. The legs of tie 94 have just crossed. The crossover point is spaced from reinforcing bar 34.

Figure 14:
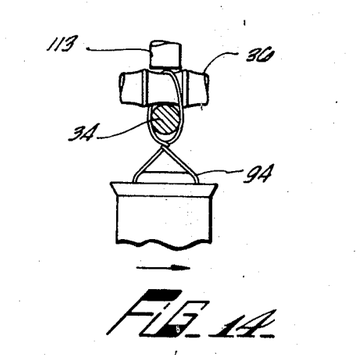

In FIG. 14 the tying process has developed to an intermediate point. Space is still present between the spiral which is being formed and reinforcing bar 34.

Figure 15:
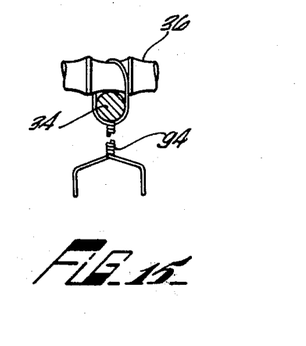

In FIG. 15 the final tie geometry is shown. The twisting tension provided on the legs of tie 94 has caused it to be deformed tightly about reinforcing bars 34 and 36. This tension is increased during the tying process since the clamped wire legs are drawn upward by the spiraling action and therefore move clamping head 46 and sleeve 48, and through shaft 44 and collar 161, increase the tension activating compression force in spring 158.

The tying process continues through the rotation of twister head assembly 14 until the legs of the tie form a tight spiral from the bar 34 down to twist head 46 and the spiral is severed by twist beyond the wire strength.

It has been found that failure will normally occur at the initial crossover point. Apparently the reason for failure at this point is that the tie metal is first distorted here and the point also feels the maximum accumulative effect of the tension and twist distortion imposed by the twister head assembly.

Upon failure in the wire tie spiral, shaft 44 is driven axially downward by compression spring 158 until collar 206 impacts on plate 162, suddenly stopping shaft 44. Since sleeve 48 has been moving downward with head 46 and shaft 44, its inertia force acts to free the clamping action on wire tie ends. Wire tie ends are drawn out of cavity 194 and through the centrifugal force of rotation removed from the twister head. Twister assembly 14 is then in position for a repetitive tying cycle, the FIG. 10 position.

The ejector head assembly is operable to supply wire ties continuously. When ejector shaft 24 passes through chuck 50 it carries a wire tie for positioning over the crossed reinforcing bars. After the wire tie clears chuck 50, blade 96 is actuated by collar 111 through buffer spring 106 on collar 102 to remove another wire tie. One leg of this tie is held by magnet pairs 90 and 92 on one side of the chuck's face. When drawbar 26 carries ejector shaft 24 through pin 152 back up above chuck 50, the chuck is rotated 90° to the alternate diagonal position by tensioned cable 54. In the alternate diagonal position, the other leg of the wire tie just removed by blade 96 is attracted to the face of the chuck.

The present invention has been described with reference to certain preferred embodiments. The spirit and scope of the appended claims should not necessarily, however, be limited to the foregoing description.

What is claimed is:

1. A wire tying apparatus for tying a first and a second object together comprising:
   (a) a magazine for a plurality of generally U-shaped wire ties;
   (b) means for selectively removing individual wire ties from the magazine and positioning each selected wire tie with its crown against the first object and its legs extending beyond the second object;
   (c) means for applying tension to the legs of a positioned wire tie to tightly draw such tie into intimate contact with the objects; and
   (d) means for twisting the legs of a positioned wire tie together into a tight spiral.

2. The wire tying apparatus claimed in claim 1 wherein the twisting means includes:
   (a) a sleeve having a cavity positioned to accept the legs of a positioned wire tie; and
   (b) a clamping head capable of receipt in the cavity having a radial surface operable with a wall of the cavity to clamp the legs of a positioned wire tie.

3. The wire tying apparatus claimed in claim 2 wherein the tension means includes:
   a spring operable through the clamping head and sleeve to maintain tension on the legs of a positioned wire tie.

4. The wire tying apparatus claimed in claim 3 wherein the clamping head and sleeve are axially displaceable with respect to each other such that the clamping head clears the cavity and the cavity accepts the legs of a positioned wire tie prior to their clamping.

5. The wire tying apparatus claimed in claim 2 wherein the tension and twisting means includes:
   (a) means to position the sleeve below the clamping head in position to receive the legs of a positioned tie within the cavity, the legs of such tie straddling the head;
   (b) means to draw the head into the cavity to clamp the legs of a positioned tie and to orient the head and sleeve in a wire tying position, the clamping head and sleeve being disposed such that a twisting space is defined between the head and the objects when the head is in its tying position, the tension means being operable through the sleeve and head in their tying position to urge the two away from the crown of a clamped wire tie, such wire tie holding the sleeve and head in the wire tying position against the action of the spring; and
   (c) means to twist the clamping head and form the tight spiral in the twisting space, a portion of the legs severing from the spiral at the completion of its formation.

6. The wire tying apparatus claimed in claim 5 wherein the tension means is responsive to the severing of the legs of a positioned wire tie to withdraw the head from the cavity and discharge such severed portions.

7. The wire tying apparatus claimed in claim 1 wherein the tension and twisting means includes:
   (a) a shaft disposed such that its axis is aligned with the axis of symmetry of a positioned wire tie;
   (b) a head fixed on one end of the shaft in position to act on a positioned wire tie;
   (c) a sleeve on the shaft having a cavity opening towards the head end of the shaft, the cavity being sized to accept the head and the legs of a positioned wire tie with the legs clamped between the radial, peripheral surface of the head and a wall of the cavity;
   (d) means to displace the head from the cavity and position a portion of the legs of a positioned wire tie within the cavity; and
   (e) means to draw the head inside the cavity into a wire tying position with a positioned wire tie's legs clamped between the head and a wall of the cavity.

8. The wire tying apparatus claimed in claim 7 wherein the tension means includes a spring disposed to urge the sleeve and head away from the crown of a positioned tie at least when the legs of such a tie are clamped by the head and sleeve, the sleeve and head being coupled to the spring such that their wire tying position is maintained against the action of the spring by the clamped legs of a positioned wire tie.

9. The wire tying apparatus claimed in claim 8 wherein the head displacing and drawing means includes means selectively operable to move the shaft, head and sleeve from an inactivated position into a wire tie receiving position, the wire tie receiving position having the head outside the cavity, the spring urging the head towards the inactivated position and the cavity in position to receive a portion of the legs of a positioned wire tie.

10. The wire tying apparatus claimed in claim 9 wherein the head displacing and drawing means includes:
   means on the shaft to carry the sleeve into the wire tie receiving position operable such that upon drawing the head into the cavity the sleeve is uncoupled from the shaft; and
   means to maintain the sleeve in the wire tie receiving position until the head is drawn into the cavity.

11. The wire tying apparatus claimed in claim 10 wherein:
   (a) the cavity of the sleeve includes
      (i) a frusto-conical entrance chamfer to facilitate the entrance of the legs of a selected wire tie into the remaining portions of the cavity; and
      (ii) a frusto-conical clamping portion axially adjacent the entrance chamber and diverging toward such entrance chamfer; and
   (b) the head includes
      a serrated clamping section and a skirt section, the clamping section being operable to clamp the legs of a positioned wire tie between it and the clamping portion of the cavity, the skirt having a taper complementing the taper of the clamping portion such that the legs of a positioned wire tie are capable of being wedged between the skirt and the clamping portion.

12. The wire tying apparatus claimed in claim 1 wherein the tension and twisting means includes:
   (a) a barrel fixed in position and spaced from the wire tie removing means and a positioned wire tie, the axis of the barrel being aligned with the axis of symmetry of a positioned wire tie;
   (b) a compression spring in the barrel;
   (c) a shaft axially disposed through the barrel and extending outwardly from the top of the barrel towards the wire tie removing means, the spring biasing the shaft away from the wire tie removing means;
   (d) a head fixed to the top of the shaft having a clamping section and a wedging section, the clamping section being generally cylindrical, the wedging section being below the clamping section and having a taper converging towards the barrel;
   (e) a sleeve on the shaft capable of translation along the shaft, the sleeve having a cavity which includes an entrance chamfer section and a tapered clamping section, the taper of the clamping section complementing the taper of the head's wedging section such that the legs of a positioned tie may be clamped; the sleeve being disposable below the head;
   (f) a collar on the shaft capable of engaging the sleeve to move the sleeve to a raised tie receiving position;
   (g) a cam selectively operable to raise the shaft, head and sleeve to the tie receiving position, with the head above the sleeve;
   (h) a pair of diametrically opposed leaf springs on the top of the barrel in position to engage and hold the sleeve in the tie receiving position;
   (i) a gear rotationally keyed to the shaft and axially constrained in the barrel, the gear being axially free of the shaft; and
   (j) means to rotate the gear.

13. The wire tying apparatus claimed in claim 1 wherein the objects to be tied are crossed and the wire tie removing means includes:
   (a) a housing;
   (b) a chuck journaled for rotation in the housing between a first and second position, the first position corresponding to a positioned wire tie orientation across a first diagonal of the crossed objects and the second position corresponding to a positioned wire tie orientation across a second diagonal of the crossed objects, the chuck being operable to accept and hold individual wire ties from the magazine;
   (c) means to rotate the chuck between the first and second positions; and
   (d) ejector means selectively operable to remove a wire tie from the chuck and position such tie on either the first or second diagonal of the crossed objects.

14. The wire tying apparatus claimed in claim 13 wherein the ejector means is operable to hold the crown of a positioned wire tie against the top of the crossed objects.

15. The wire tying aparatus claimed in claim 14 wherein the wire tie removing means includes:
   (a) a blade to remove individual wire ties from the magazine; and
   (b) means to operate the blade.

16. The wire tying apparatus claimed in claim 15 wherein the chuck has at least one magnet having a north and south pole disposed to hold the legs of an individual wire tie.

17. The wire tying apparatus claimed in claim 16 wherein the ejector means includes:
   (a) a shaft slidably mounted in the housing in position to engage the crown of a wire tie and drive the wire tie into position, the shaft being capable of holding the positioned wire tie against the top of the crossed objects; and
   (b) a guide fixed to the bottom of the chuck and journaled in the housing having an opening therethrough for the ejector shaft and a wire tie, the opening including narrow channel-like portions to guide the legs of a wire tie as they pass through the guide in response to the ejector shaft.

18. The wire tying apparatus claimed in claim 17 wherein
   the wire tie removing blade is operatively coupled to the ejector shaft such that upon ejecting a wire tie a new wire tie is removed from the magazine.

19. The wire tying apparatus claimed in claim 18 including a spring-biased detent in the path of the removing blade and capable of holding a loose wire tie away from the chuck until the blade engages the loose tie and depresses the detent.

20. The wire tying apparatus claimed in claim 19 wherein the rotating means includes
   (a) a pulley coupled to the chuck;
   (b) a cable engaged on the pulley; and
   (c) means to pull the cable to selectively rotate the pulley between the first and second positions.

21. The wire tying apparatus claimed in claim 13 wherein
   (a) the magazine is capable of storing the plurality of U-shaped wire ties with such plurality being arranged with the planes of the wire ties in parallel and the wire ties aligned; and
   (b) the magazine includes wire tie feed means including a trolley capable of abutting the last of the plurality of wire ties and a spring coupled to the trolley such taht the plurality of wire ties is urged towards the housing.

22. The wire tying apparatus claimed in claim 21 wherein the magazine is mounted at an agle to the housing, the chuck's axis of rotation being vertical, and includes guide means to maintain wire tie orientation between the magazine and the chuck.

23. A wire tying apparatus for tying reinforcing bar panels and the like comprising:
   (a) a frame;
   (b) means to support a plurality of longitudinal reinforcing bars and at least one transverse reinforcing bar such that the transverse bar may be tied to the plurality of longitudinal bars at a plurality of tying stations;

(c) a twister head assembly on the frame for each tying station, each twister head assembly being in position to twist the legs of a wire tie into a tight spiral around a transverse bar and a longitudinal bar, each twister head assembly includes twisting and tensioning means for twisting the legs of a positioned wire tie together while applying tension to the legs;

(d) means to house a plurality of wire ties for each twister head assembly; and (e) means associated with each of the twister head assemblies for transferring an individual wire tie from the housing means and positioning such wire tie over the transverse and longitudinal reinforcing bars.

24. The wire tying apparatus claimed in claim 23 wherein each twister head assemby includes:

(a) a sleeve having a cavity oriented to accept the legs of a positioned wire tie; and (b) a head capable of receipt in the cavity and having a radial surface capable of cooperating with a wall of the cavity to clamp the legs of a positioned wire tie when the head is in the cavity.

25. The wire tying apparatus claimed in claim 24 wherein each twister head assembly includes:

(a) means to position the sleeve below the head in position to receive the legs of a wire tie positioned over a transverse reinforcing bar and a longitudinal reinforcing bar;

(b) means to draw the head into the cavity to clamp the legs of a positioned wire tie, the tension means being operable through the head to urge the head and sleeve away from the crown of a clamped wire tie; and (c) means to rotate the head and sleeve to twist the legs of a positioned wire tie into a tight spiral, with the clamped portion of the legs severing at the spiral after it is formed.

26. The wire tying apparatus claimed in claim 25 wherein the transfer and positioning means include an ejector head assembly for each of the twister head assemblies, each ejector head assembly including:

(a) a housing;

(b) a chuck journaled for rotation in the housing between a first and second position, the first position corresponding to a positioned wire tie orientation along a first diagonal of a crossed transverse and longitudinal reinforcing bar and the second corresponding to a positioned wire tie orientation along the other diagonal, the chuck being operable to accept and hold individual wire ties from the housing means;

(c) means to rotate the chuck between the first and second positions; and (d) ejector means selectively operable to remove a wire tie from the chuck and position such tie on either of the diagonals.

27. The wire tying apparatus claimed in claim 26 wherein:

the ejector means includes means to hold a positioned wire tie by its crown against a longitudinal and transverse reinforcing bar.

28. The wire tying apparatus claimed in claim 27 wherein the ejector assemblies and the twister head assemblies are removably secured to the frame, the frame having means for mounting the ejector and twister head assemblies to adjust the transverse spacing between the tying stations.

29. The wire tying apparatus claimed in claim 27 wherein the ejector means of each of the ejector assemblies includes an ejector shaft supported in the housing and a drawbar operable to depress the ejector shafts in unison and position and hold the wire ties over the reinforcing bars.

30. The wire tying apparatus claimed in claim 29 wherein the twister head assemblies are operable in unison to simultaneously tie a plurality of longitudinal reinforcing bars to a transverse bar.

31. The wire tying apparatus claimed in claim 29 wherein the ejector shafts are coupled to the drawbar to allow relative movement between the two when the ejector shafts are holding wire ties against the crossed reinforcing bars.

References Cited

UNITED STATES PATENTS 3,169,559 2/1965 Working, Jr. ________ 140—119
3,211,187 10/1965 Paule et al. ________ 140—119

LOWELL A. LARSON, Primary Examiner

U.S. Cl. X.R.

140—93, 115